Patented Oct. 31, 1933

1,932,643

UNITED STATES PATENT OFFICE 1,932,643

PROCESS OF PRODUCING EMULSIFIABLE MATERIALS OF WAX-LIKE CHARACTER

Walther Schrauth, Berlin-Wilmersdorf, Germany, assignor, by mesne assignments, to Unichem Chemikalien Handels A.-G., Zurich, Switzerland, a corporation of Switzerland No Drawing. Application March 8, 1929, Serial No. 345,618, and in Germany March 8, 1928

13 Claims. (Cl. 87—19)

This invention relates to a process for making emulsifiable materials of wax-like character.

Generally the possibility of emulsifying the genuine waxes, as far as it really exists, is subject to the presence of certain non-wax-like substances. For instance, wool fat possesses the capacity of fixing water only owing to its content of cholesterin and iso-cholesterin, and in the Japan wax the same property is due to the presence of a dibasic high-molecular carboxylic acid. Neutral waxes however as, for instance, cetyl palmitate known as spermaceti have, if any, only an extremely small capacity of fixing water.

I now have found that the capability of fixing water and in connection therewith the possibility of emulsifying wax-like substances in aqueous solutions may be provoked or considerably increased by admixing with spermaceti and the neutral portions of Montan wax or even high-fusing hydrocarbons as paraffin, ceresin or ozocerite, alcohols of higher molecular weight solid at room temperature, and furthermore fatty or resin acids. The mixed products thus obtained are then capable of forming emulsions with pure or slightly alkalified water, which contain a multiple of their own weight, in some cases the 5- to 6-fold quantity of water and are almost permanently stable.

For instance, a product of the kind described is obtained by melting together 65 parts of spermaceti with 25 parts of cetyl alcohol and 10 parts of stearic acid. This product has a fusing point of about 50° C. and in the molten state is capable of combining with as much as 600% of its own weight of a 2% sodium carbonate solution.

Instead of the spermaceti mentioned in the foregoing example, as already indicated, the neutral portions of Montan wax, paraffin, ceresin, ozocerite &c. may be used with the same result. Instead of cetyl alcohol also wool fat alcohols, mono- and diglycerides of organic acids or the like may be employed, and finally instead of stearic acid also palmitic acid, colophony or similar substances may be used.

The mixed products thus obtained are determined, according to their special properties, above all for the refinement of fibers, but they may also be used for making lubricants, floor polishing masses, paraffin pastes or polishing creams, for water-proofing paper, for making oil emulsions, in the construction of roads, for making insecticides and for many other purposes.

I claim:—

1. The process of producing solid synthetic substances of wax-like character which when melted will absorb more than 500% of water containing 2% of sodium carbonate to produce a homogeneous colloidal mass which comprises mixing and melting together a wax, a higher molecular aliphatic alcohol solid at ordinary temperatures and a fatty or resin acid.

2. As an article of manufacture, a substance of wax-like character capable of combining with 500% of water containing 2% of sodium carbonate to form a colloidal mass comprising a neutral wax, an aliphatic alcohol of high molecular weight and an acid of the fatty or resin acid type.

3. As an article of manufacture, a substance of wax-like character capable of combining with 500% of water containing 2% of sodium carbonate to form a colloidal mass comprising material of the group consisting of neutral wax, paraffin, ceresin and ozocerite, an aliphatic alcohol of high molecular weight solid at room temperature and an acid of the fatty or resin acid type.

4. As an article of manufacture, a substance of wax-like character capable of combining with 500% of water containing 2% of sodium carbonate to form a colloidal mass comprising approximately 65% of a neutral wax, approximately 25% of an aliphatic alcohol of high molecular weight and approximately 10% of a fatty or resin acid.

5. As an article of manufacture, a substance of wax-like character capable of combining with 500% of water containing 2% of sodium carbonate to form a colloidal mass comprising approximately 65% of spermaceti, approximately 25% of cetyl alcohol and approximately 10% of stearic acid.

6. As an article of manufacture, a substance of wax-like character capable of combining with 500% of water containing 2% of sodium carbonate to form a colloidal mass comprising spermaceti, aliphatic alcohol and stearic acid.

7. The process of producing solid synthetic substances of wax-like character which when melted will absorb more than 500% of water containing 2% of sodium carbonate to produce a homogeneous colloidal mass which comprises mixing and melting together a wax, an aliphatic higher molecular alcohol solid at ordinary temperatures and a fatty or resin acid.

8. As an article of manufacture, a substance of wax-like character capable of combining with 500% of water containing 2% of sodium carbonate to form a colloidal mass comprising a neutral wax, an aliphatic alcohol of high molecular weight and an acid of the fatty or resin acid type.

9. As an article of manufacture, a substance of wax-like character capable of combining with 500% of water containing 2% of sodium carbonate to form a colloidal mass comprising approximately 65% of a neutral wax, approximately 25% of an aliphatic alcohol of high molecular weight and approximately 10% of a fatty or resin acid.

10. The process of producing emulsifiable substances of wax-like character, comprising uniting neutral waxes of a higher fusing point with aliphatic alcohols of higher molecular weight solid at room temperature, and furthermore with fatty or resin acids of higher molecular weight.

11. As an article of manufacture, a substance of wax-like character capable of combining with 500% of water containing 2% of sodium carbonate water to form a colloidal mass comprising a neutral wax of the group consisting of spermaceti, the neutral portions of Montan wax, paraffin, ceresin, ozocerite, an aliphatic alcohol of high molecular weight and an acid of the fatty or resin acid type wherein the quantity of the aliphatic alcohol is of the order of 25% of the whole.

12. As an article of manufacture, a substance of wax-like character capable of combining with 500% of water containing 2% of sodium carbonate of water to form a colloidal mass comprising a neutral wax of the group consisting of spermaceti, the neutral portions of Montan wax, paraffin, ceresin, ozocerite, an aliphatic alcohol of high molecular weight and an acid of the fatty or resin acid type wherein the quantity of the aliphatic alcohol is of the order of 25% of the whole, and the quantity of acid is of the order of 10% of the whole.

13. As an article of manufacture a substance of waxlike character capable of combining with water containing 2% of sodium carbonate to form a stable colloidal mass comprising more than 50% of neutral wax, more than 10% of a high molecular aliphatic alcohol and a fatty acid or resin acid substantially as described.

WALTHER SCHRAUTH.